Figure 1:
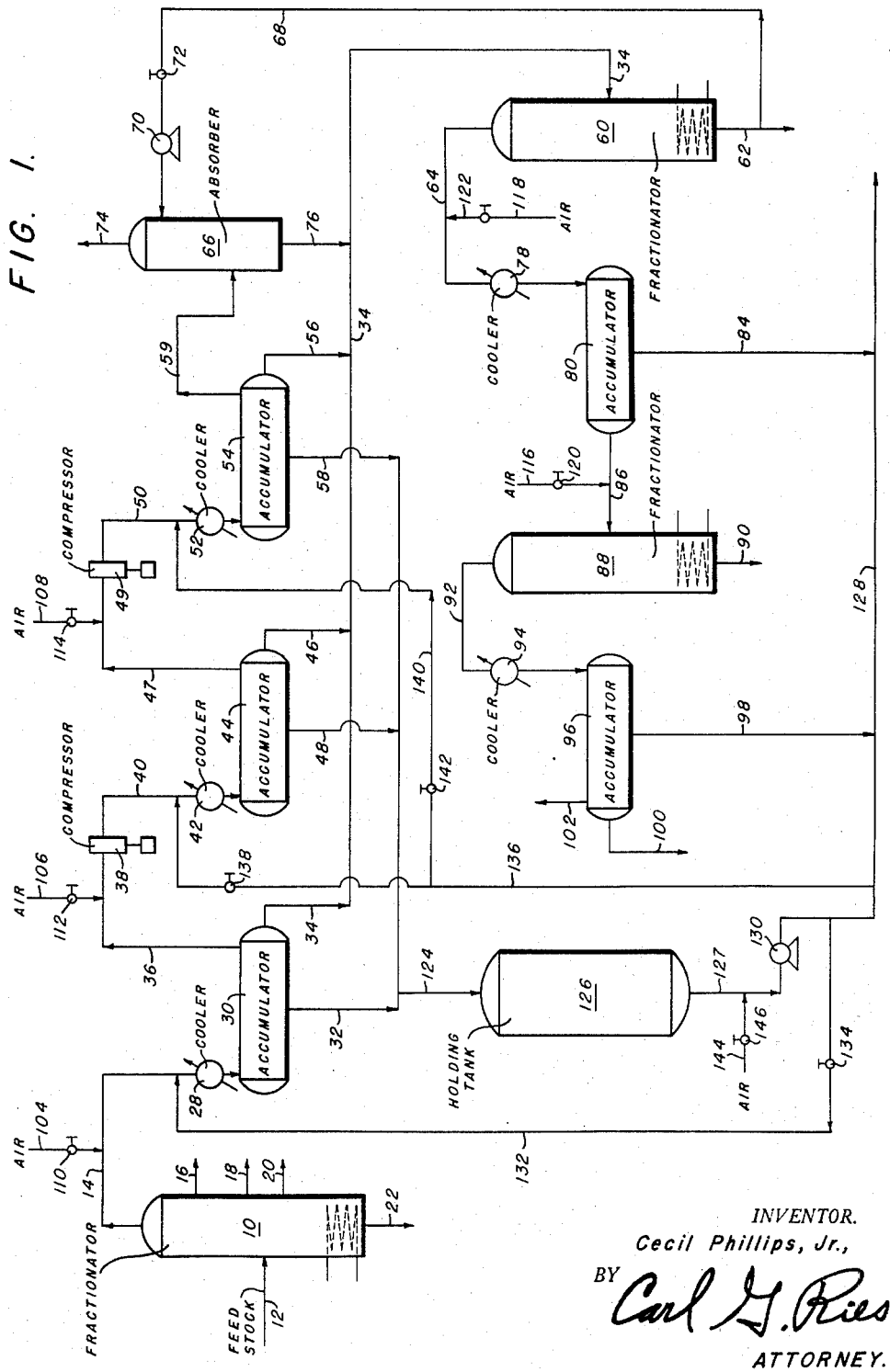

Aug. 2, 1960 C. PHILLIPS, JR 2,947,686
PROCESS FOR THE PREVENTION OF CORROSION
OF PETROLEUM REFINING EQUIPMENT
Filed May 18, 1955 2 Sheets-Sheet 1

INVENTOR.
Cecil Phillips, Jr.,
BY
ATTORNEY.

INVENTOR.
Cecil Phillips, Jr.,
BY
ATTORNEY.

United States Patent Office 2,947,686
Patented Aug. 2, 1960

2,947,686

PROCESS FOR THE PREVENTION OF CORROSION OF PETROLEUM REFINING EQUIPMENT

Cecil Phillips, Jr., Baytown, Tex., assignor, by mesne assignments, to Esso Research and Engineering Company, Elizabeth, N.J., a corporation of Delaware Filed May 18, 1955, Ser. No. 509,306

8 Claims. (Cl. 208—340)

This invention relates to a process for protecting metallic surfaces from deterioration while in contact with alkaline, chemical products containing water contaminated with sulfides and cyanides. More particularly, this invention relates to a process for protecting the metallic surfaces of stripping equipment utilized in recovering petroleum products from corrosion, blistering, fissuring, embrittlement, etc. while such surfaces are in contact with hydrocarbon petroleum products containing water contaminated with sulfides, cyanides and similar corrosive impurities.

It is frequently necessary to process alkaline chemical products containing water contaminated with corrosive sulfide and cyanide type compounds such as hydrogen sulfide, hydrogen cyanide, etc., ammonia, organic acids such as formic acid, acetic acid, etc. and salts thereof, etc. When processing operations are conducted in metal surfaced equipment a serious metals deterioration problem is encountered. Thus, for example, copper surfaces may suffer severe stress corrosion as a result of ammonia attack while steel surfaces may be damaged by the absorption of atomic hydrogen released by corrosion of the steel by hydrogen sulfide. This latter type of corrosion problem is accentuated if cyanides, organic acids, salts thereof, etc. are present, for such substances are known to promote the absorption of atomic hydrogen in steel.

It has been proposed to overcome the corrosion problems that are encountered in treating aqueous chemical products contaminated with cyanides and sulfides through the addition of inhibiting amounts of polysulfides. It has also been proposed to form polysulfides in situ in situations wherein hydrogen sulfide and ammonia are present by adding air or a similar oxygen-containing gas. When this is done it is postulated that ammonium hydrosulfide is formed by the reaction of ammonia with hydrogen sulfide and that the ammonium hydrosulfide reacts with oxygen to form polysulfides such as ammonium disulfide, ammonium trisulfide, etc. Ammonium disulfide is predominantly formed. It is further postulated that when cyanides are present the polysulfides will react therewith to form thiocyanates, whereby the corrosion-promoting cyanides are eliminated.

However, the results obtained heretofore have not been entirely satisfactory, particularly when comparatively large amounts of cyanides are present or when elevated temperatures are employed during processing operations, or both. In the former situation cyanides may not be completely eliminated through the formation of thiocyanates. Moreover, the thiocyanates are corrosive if present in too large an amount. When elevated temperatures of about 300° C. or more are employed the thiocyanates will decompose to form cyanides (e.g., hydrogen cyanide) and sulfides (e.g., hydrogen sulfide).

Accordingly, an object of the present invention is the provision of a process for protecting metallic surfaces against deterioration while such surfaces are in contact with alkaline chemical products containing water contaminated with sulfides and cyanides.

Another object is the provision of a process for the prevention of deterioration of petroleum refining equipment due to high temperature contact with water containing sulfide, cyanide, etc. type contaminants.

A further object is the provision of a process for protecting metallic equipment utilized in processing water containing initially gaseous, normally liquid petroleum products from deterioration due to contact with sulfide, ammonia, cyanides, etc. type contaminants present in such gaseous products.

These and other objects are attained by injecting air into a water-containing chemical product containing sulfides and cyanides in the presence of ammonia while maintaining the metallic surfaces to be protected in contact with circulating water having an average air contact age of at least about one hour or more. The water should be maintained at a pH of about 7.5 or more with ammonia.

The air contact age of water may be defined as the time that has elapsed after the injection of air into the water. Thus, immediately after air injection water will have an air contact age of zero and an hour later will have an air contact age of one hour. Accordingly, the average air contact age of a body of water will be the average of the air contact ages of the components comprising the same.

The process of the present invention may be practiced in a wide variety of situations wherein aqueous alkaline chemical products are processed. Thus, equipment utilized in the distillation of water-containing hydrocarbon products, the compression and condensation of water-containing hydrocarbon vapors, etc. may be protected in accordance with the present invention. The invention is employed to particular advantage in condensing the water vapor-containing gaseous products derived from the fluidized catalytic cracking of a petroleum charge stock such as a charge stock boiling in the gas oil range and in removing condensed water therefrom.

Figure 2:
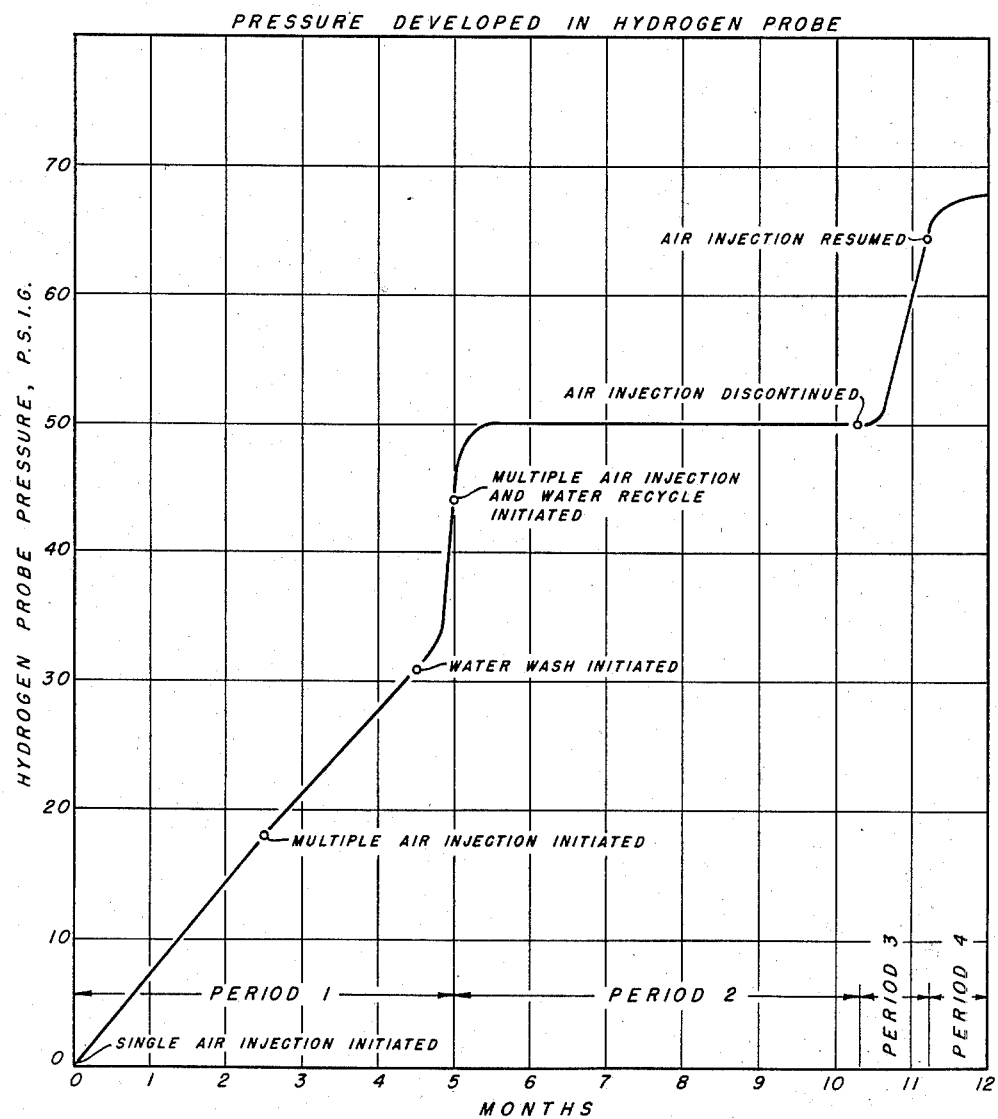

A typical process for recovering hydrocarbons obtained by the fluidized catalytic cracking of a petroleum feed stock and for separating water therefrom is schematically shown in Figure 1 of the drawings, and the degree of corrosion activity of the materials processed in such an operation under a variety of operating conditions is graphically illustrated in Figure 2.

Turning now to Figure 1, there is diagrammatically shown a fractionator such as a distillation column 10 to which gaseous fluidized catalytic cracking products are delivered from a fluidized catalytic cracking unit (not shown) by way of line 12. The fluidized catalytic cracking products will normally comprise a mixture of hydrocarbons, steam and contaminants including hydrogen sulfide, ammonia, hydrogen cyanide, formic acid, etc. Within the distillation column 10 a primary separation of products is made to provide a gaseous overhead fraction delivered through an overheads line 14 comprising, for example, normally gaseous hydrocarbons, vaporous normally liquid lower boiling hydrocarbons such as hydrocarbons boiling in the gasoline range, water vapor (e.g., steam), ammonia, hydrogen sulfide, hydrogen cyanide, formic acid, etc. Heavier hydrocarbons are separated into a plurality of side stream fractions having suitable boiling ranges and are delivered from the distillation column 10, for example, through side delivery lines 16, 18 and 20 and through a bottoms line 22. Thus, a heating oil fraction may be delivered through the line 16, a light gas oil fraction may be delivered through the line 18, a heavy gas oil fraction may be delivered through the line 20 and heavier hydrocarbon components may be delivered through the bottoms line 22.

The overhead fraction delivered to the overhead line 14 will normally be at an elevated temperature such as a temperature within the range of about 250 to 400° F. and is passed through an overheads cooler 28 wherein the temperature is decreased to an extent sufficient to condense a substantial portion of the water vapor contained in the overheads fraction and to also condense a portion of the hydrocarbons. From the cooler 28 the product passes to an overheads accumulator 30. Within accumulator 30 a phase separation between the condensed hydrocarbons and condensed water is effected and the water is discharged through a bottoms line 32 for collection in a manner to be described. Hydrocarbons are discharged from the accumulator 30 through a side delivery line 34 for further processing, as will be hereafter described, and uncondensed gaseous components are discharged through an overheads line 36. A portion of the contaminants present in the gaseous overheads will be dissolved in the condensed water and another portion will be dissolved in the condensed hydrocarbons while the remaining portion will pass to the overheads line 36 together with the uncondensed gaseous components. In addition, a certain amount of condensed water will be entrained in the condensed hydrocarbons discharged through the line 34.

The uncondensed gaseous components passing through the line 36 may be further processed in any suitable manner to recover additional quantities of hydrocarbons and to condense further quantities of water vapor. Thus, for example, the gaseous components may be passed through the line 36 to a first stage compressor 38, and thence by line 40 through a first stage cooler 42 to a first stage accumulator 44 wherein additional quantities of water and hydrocarbons are liquefied and separated, the water being discharged through the line 48 and the hydrocarbons and water entrained therewith being discharged through the line 46 into the discharge line 34 from the overheads accumulator 30. As an example, the gaseous material passing through the first stage compressor 38 may be compressed therein to a pressure of about 50 to 100 p.s.i.g., whereby the temperature will be raised to about 150 to 200° F. and thereafter the compressed material may be cooled to a temperature of about 100 to 150° F. in the first stage cooler 42. Uncondensed hydrocarbons, water vapor and, again, a portion of the contaminants pass from the accumulator 44 through an overheads line 47 to a second stage compressor 49 and thence, by way of line 50 through a second stage cooler 52 to a second stage accumulator 54 wherein liquefied hydrocarbons are collected for discharge therefrom through the line 56 into the line 34. Condensed water is discharged through the line 58. The gaseous material passed to the second stage compressor 49 through the line 47 may be compressed therein, for example, to a pressure of about 100 to 150 p.s.i.g., whereby the temperature will be increased to about 200 to 250° F. The compressed material is thereafter cooled to a temperature of about 100 to 130° F. in the second stage cooler 52. Uncondensed water vapor, hydrocarbons and contaminants are discharged from the second stage acccumulator through the line 59.

Hydrocarbons recovered in the accumulators 30, 44 and 54 may be processed in any suitable manner to remove entrained water and dissolved contaminants. Thus, for example, the condensed hydrocarbons delivered to the line 34 from the overheads accumulator 30, in admixture with condensed hydrocarbons delivered to the line 34 through the lines 46 and 56 from the first and second stage accumulators 44 and 54, may be delivered to a suitable fractionator such as a distillation column 60 operated in a manner such that hydrocarbons boiling in and above the gasoline boiling range are delivered from the column 60 in liquid form as bottoms through the bottoms line 62; the lighter hydrocarbons, vaporized water and contaminants being substantially completely stripped therefrom and being delivered overhead through a line 64 in a vaporous condition. The vaporized hydrocarbons delivered to the line 64 may comprise, for example, a mixture of $C_1$ to $C_5$ hydrocarbons.

The uncondensed gaseous mixture delivered from the second stage accumulator 54 will normally contain recoverable hydrocarbons and when such recoverable hydrocarbons are to be processed, any suitable means may be employed for isolating the same from the gaseous mixture. Thus, for example, the uncondensed gaseous material may be delivered by the line 59 to the bottom of a suitable absorber such as an absorption tower 66 and a portion of the condensed gasoline components taken as bottoms from the distillation tower 60 by way of the line 62 may be recycled to the absorption tower 66 by way of a recycle line 68 containing a pump 70 and controlled by a valve 72. During passage through the absorption tower 66 the recycled gasoline components will absorb uncondensed hydrocarbons and may also absorb residual amounts of contaminants. Gases which are not absorbed are delivered overhead from the absorption tower 66 through a line 74 for discharge from the system and the enriched recycled gasoline fraction is delivered to the line 34 from the absorption tower 66 through a bottoms line 76 for return to the distillation column 60.

Returning now to the distillation column 60, the overheads delivered therefrom are passed by way of the line 64 through a third stage cooler 78 to a third stage accumulator 80. The material passing through the third stage cooler may be chilled to an extent sufficient to liquefy a portion of the hydrocarbons and a portion of the vaporized water. As a consequence, a substantial portion of the contaminants will be redissolved in the condensed water and condensed hydrocarbons. Phase separation between the condensed hydrocarbons and condensed water occurs in the third stage accumulator 80. Condensed water is discharged from the accumulator 80 through a water discharge line 84. The remaining material is passed through a line 86 to a next fractionating tower 88 which is operated in a manner such that there is discharged as bottoms an additional liquid hydrocarbon fraction such as a mixture of $C_4$ and $C_5$ hydrocarbons substantially stripped of contaminants, water vapor and lighter hydrocarbons; the stripped material being taken overhead in a vaporous condition through an overhead line 92. This material is passed through an additional cooler 94 and from thence to an accumulator 96. The cooler may be operated so as to selectively liquefy $C_3$ hydrocarbons and water vapor, which are collected in the accumulator. The condensed water may be discharged through the line 98 and the condensed $C_3$ hydrocarbons may be discharged through the line 100 while residual uncondensed material may be discharged through the line 102.

In order to prevent deterioration of the equipment utilized in processing operations of the type just described, air or a similar oxygen-containing gas is injected at one or more points throughout the system and provision is made for the circulation of water having an average air contact age of about 1 hour or more. The air may be injected at one or a plurality of suitable points. Thus, for example, air may be injected through one or more of the air injection lines 104, 106 and 108 controlled by valves 110, 112 and 114, such air lines leading, respectively, to the overheads line 14, the overheads accumulator discharge line 36, and the overheads first stage accumulator line 47. Air may also be injected at one or more subsequent points throughout the system such as through lines 116 and 118 containing valves 120 and 122 respectively; the line 116 leading to the line 86 from the accumulator 80 and the line 118 leading to the overheads line 64 from the fractionating column 60. Air may be injected at any other suitable point if desired.

It is generally preferable to inject air at as few points as possible. Thus, air may be injected solely through the line 104 leading to the overheads line 14 or, as another example, may be simultaneously injected through the line 104 and through the line 116 leading to the fractionating column 88.

In accordance with the present invention, a circulating stream of water having an average air contact age of about one hour or more is provided. For this purpose the water condensed in the accumulators 30, 44 and 54 and discharged therefrom by way of the lines 32, 48 and 58 may be delivered by means of a line 124 to a suitable collection vessel such as the holding tank 126. Water is discharged from the holding tank 126 through a line 127 to a pump 130. A water discharge line 128 leading from the pump 130 may be provided with one or more branch lines for recycling water to the system. Thus, for example, there may be provided a recycle line 132 controlled by a valve 134 leading to the overheads line 14 which passes to the overheads cooler 28. There may also be provided a branch line 136 controlled by a valve 138 leading from the discharge line 128 to the line 40 leading to the first stage accumulator 44. In addition, there may be provided a branch line 140 containing a valve 142 branching from the line 136 and leading to the line 50 in the second stage compression stage.

Water condensed in the accumulators 80 and 96 will normally contain a significant quantity of dissolved organic acids and other impurities and, as a result, the water accumulated therein is preferably discharged from the system by way of the lines 84 and 98 which lead to the water discharge line 128. However, if desired, such water may be recycled to the holding tank 126 through suitable lines (not shown).

Air may also be injected into the water to be recycled as, for example, by means of an air injection line 144 containing a valve 146 leading to the discharge line 128.

As a specific example of operations, about 20,000 cubic feet per minute of gaseous material consisting primarily of vaporized hydrocarbons and containing water vapor, ammonia, hydrogen sulfide, hydrogen cyanide, formic acid, etc. may be passed through the overheads line 14 for processing. In this situation about 40 gallons per minute of condensed water may be discharged from the accumulator 30 through the discharge line 32 and about 10 gallons per minute of condensed fresh water may be discharged from each of the accumulators 44 and 54 through the lines 48 and 58.

In this situation, water having an average air contact age of about one hour or more may be provided, for example, by injecting about 10 to 200 cubic feet of air per minute (about .005 to .01 cubic foot of air per cubic foot of gaseous overheads) into the holding tank discharge line 127 and by recycling a portion of the water discharged by the pump 130 through the recycle line 132 leading to the overheads line 14. The remaining portion of the water (e.g., about 60 gallons per minute) may be discharged from the system through the discharge line 128. When the holding tank 126 has a capacity such that the average residence time of the water contained therein is within the range of about 20 minutes to two hours and when about 50 to 100 gallons per minute of water are recycled, the water will have an average air contact age of about 1 hour or more. In general, about 0.5 to 10 gallons of water per 1,000 cubic feet of gaseous overheads should be recycled.

As another example, and when metals deterioration in the accumulator 30 does not present a serious problem, as is frequently the case, about 25 to 50 gallons of water per minute may be recycled through each of the recycle lines 136 and 140 for the lines 40 and 50 leading, respectively, to the first stage accumulator 44 and the second stage accumulator 54. In this situation, air may be injected solely into the overheads line 14 from the air injection line 104 or, as is sometimes desirable when comparatively large amounts of contaminants are present in the terminal cooler 94 and the terminal accumulator 96, air may be simultaneously injected into both the overheads line 14 and the line 86 leading to the terminal fractionating tower 88. This may be accomplished by injecting air through the air injection lines 104 and 116.

An example of the effect of hydrogen cyanide and hydrogen sulfide corrosion with respect to hydrogen blistering of an iron surfaced accumulator under a variety of operating conditions over a 12 month period is graphically illustrated in Figure 2 as considered in conjunction with operating conditions as shown in Table I, which follows. In obtaining the data, a hydrogen probe of the type described by R. T. Effinger et al. (Hydrogen Attack of Steel in Refinery Equipment, Proc. API 31M (III) 107–53 (1951)) was employed to detect the rate of diffusion of hydrogen in the accumulator. A hydrogen probe of this nature comprises, generally, an inner rod and an outer steel tube defining a closed annular space therebetween wherein atomic hydrogen diffused through the outer tube accumulates in the form of molecular hydrogen. Suitable means, such as a pressure gauge, is provided for measuring the pressure generated by the molecular hydrogen in the annular space between the inner rod and the outer tube. The rate of hydrogen diffusion can be computed from the rise in the internal pressure in the hydrogen probe since hydrogen diffused into the annular space will remain therein. It is to be noted that the pressure within the probe will not diminish (unless hydrogen is bled therefrom) so that the rate of increase of pressure is the significant factor rather than actual hydrogen pressure.

In conducting test operations, a process of the type schematically shown in Figure 1 was employed with provision made for the introduction of air through the air injection line 104 leading to the overheads line 14 and also through the air injection line 116 leading to the line 86. The hydrogen probe was installed adjacent the bottom of the accumulator 96.

In operation, about 20,000 cubic feet per minute of gaseous products were delivered overhead through the line 14 from the distillation column 10, the overhead gaseous material passing through the recovery system of Figure 1 in the described manner. Before protective measures were employed, it was determined that about 1,500 parts by weight of cyanide ions per million parts of water were present in the water in the accumulator 96. In this situation an average pressure rise of about 40 pounds per day was observed in the hydrogen probe, which represented an average hydrogen diffusion rate of about 108 cc. of hydrogen per square foot per day. At the outset of period 1 (Table I, infra), water recycle was not employed although an average of about 15 cubic feet of air per minute were injected solely through the air injection line 104 leading to the overheads line 14. After about 11 weeks of period 1 had elapsed, conditions were changed so that about 10 cubic feet of air per minute was simultaneously injected through each of the air injection lines 104 and 116 leading, respectively, to lines 14 and 86. About 10 weeks later suitable means (not shown) were provided for washing the vapors passing to the cooler 28 for the overheads accumulator 30 with about 80 gallons per minute of fresh wash water from an extraneous source (not shown). This water was not recycled. At the same time, air injection was discontinued. This water washing technique was continued to the end of period 1. It will be noted from Table I and Figure 2 that during this period there was an appreciable rate of increase of pressure in the hydrogen probe indicating an appreciable rate of hydrogen diffusion which was, nevertheless, substantially less than the diffusion rate initially encountered. It will be further noted from Figure 2 that the rate of hydrogen diffusion was materially increased when fresh water washing was employed, thus indicating that water washing was not effective.

Subsequently, air injection at the indicated rate through the air injection lines 104 and 116 was resumed and, at the same time, about 45 gallons per minute of water from the holding tank 126 was recycled to each of the lines 40 and 50 through each of the recycle lines 136 and 140 to provide water having an average air contact age of about one hour throughout the recovery system. It will be noted from Figure 2 that, as a result, hydrogen diffusion was substantially completely eliminated so that the corrosion problem was overcome. This is shown by the fact that the pressure in the hydrogen probe remained constant.

In order to check the results obtained, air injection was discontinued at the beginning of period 3 (Figure 2) although water recycle was continued. Under this set of operating conditions hydrogen diffusion activity was again intiated. Corrosion was eliminated during period 4 (Figure 2) by resuming the injection of air.

The polysulfide concentration and cyanide concentration during the test period and the average hydrogen probe pressure rise and average hydrogen diffusion rate are set forth in Table I.

Table I

| Period | Range of Polysulfide Conc., Pts./Million | Range of Cyanide Conc., Pts./Million | Average Hydrogen Probe Pressure Rise, Lbs./Day | Calculated Average Hydrogen Diffusion Rate, Cc./Sq.Ft./Day | Average Air Contact Age of Water |
|---|---|---|---|---|---|
| 1 | 0.2-5 | 1,500-2,000 | 0.3-10 | 0.5-25 | 30 minutes. |
| 2 | 5-50 | 1,500-2,260 | 0 | 0 | 60-90 minutes. |
| 3 | 2-4 | 1,500-2,260 | 1.0-1.5 | 2.0-3.0 | 30 minutes. |
| 4 | 5-50 | 1,500-2,260 | 0.04-0.06 | 0.05-0.10 | 60-90 minutes. |

From the table it will be noted that throughout the test period a substantial concentration of cyanides was present and that metals deterioration was prevented only when air injection and water recycle throughout at least a portion of the system were simultaneously employed.

What is claimed is:

1. In a process wherein metallic surfaces are brought into contact with a chemical product containing water having a pH of at least about 7.5 and contaminated with sulfides, cyanides and ammonia, the improved method for protecting said metal surfaces against corrosion in the continued presence of said cyanides which comprises injecting air into the said chemical product and simultaneously maintaining a circulating body of water having an air contact age of at least about one hour in contact with said metallic surfaces.

2. A method as in claim 1 wherein the metallic surfaces are maintained in contact with water having an average air contact age of about 1 to 2 hours.

3. A method as in claim 1 wherein contaminants comprise ammonia, hydrogen sulfide and hydrogen cyanide.

4. In a process for liquefying hydrocarbons in a vaporized hydrocarbon product containing water vapor, hydrogen sulfide, hydrogen cyanide and ammonia and for condensing the water vapor and separating the same from liquefied hydrocarbons in metal-surfaced equipment, the improvement for protecting the metallic surfaces from deterioration in the continued presence of cyanides which comprises injecting about 0.005 to 0.1 volume percent of air into at least a portion of said gaseous product and maintaining the metallic surfaces to be protected in contact with a circulating body of condensed water having an average air contact age of about 1 to 2 hours.

5. In a method for processing a vaporized product comprising $C_1$ to $C_9$ hydrocarbons, water vapor, and minor amounts of ammonia, hydrogen sulfide and hydrogen cyanide wherein the said vaporized product is sequentially compressed, cooled, compressed and fractionated for liquefaction and recovery of hydrocarbons contained therein and for liquefaction of a major portion of the water vapor in metal-surfaced equipment, the improvement for protecting the metallic surfaces from deterioration in the continued presence of cyanides which comprises injecting about 0.05 to 1 volume percent of air, based on the original volume of vaporized product, into at least the vaporized product prior to initial cooling of the same and simultaneously collecting said recovered condensed water and recycling the same to at least a portion of the compressed components of said product at a rate such that the average air contact age of the condensed water in said system is in the range of about 1 to 2 hours.

6. A process as in claim 5 wherein air is also injected at at least one other point.

7. A process as in claim 5 wherein air is also injected into a portion of said product substantially free from $C_5$ to $C_9$ hydrocarbons.

8. In a method for processing a vaporized product comprising $C_1$ to $C_9$ hydrocarbons, water vapor, and minor amounts of ammonia, hydrogen sulfide and hydrogen cyanide wherein the said vaporized product is sequentially compressed, cooled, compressed and fractionated in metal-surfaced equipment for liquefaction and recovery of hydrocarbons contained therein and for liquefication of a major portion of the water vapor, the improvement for protecting said metallic surfaces from deetrioration in the continued presence of cyanides which comprises injecting about 0.05 to 1 volume percent of air, based on the original volume of vaporized product, into at least the vaporized product prior to initial cooling of the same and simultaneously collecting said recovered condensed water and recycling the same to at least a portion of the compressed components of said product at a rate within the range of about 0.5 to 10 gallons of water per 1000 cubic feet of initially obtained vaporized product such that the average air contact age of the condensed water in said system is in the range of about 1 to 2 hours, said water containing at least about 1500 parts by weight of cyanide ions per million parts of water.

References Cited in the file of this patent

UNITED STATES PATENTS

| 2,162,933 | Bolinger et al. | June 20, 1939 |
| 2,400,431 | Montgomery et al. | May 14, 1946 |
| 2,499,435 | Whitacre | Mar. 7, 1950 |
| 2,780,583 | Skei et al. | Feb. 5, 1957 |

OTHER REFERENCES

Bonner et al.: Petroleum Processing, vol. 8, May 1953, pages 686–690.

Bonner et al.: Petroleum Processing, vol. 8, June 1953, pages 878–883.

Akimor: "Corrosion," vol. 11, November 1955, pages 477T–486T. (Translation of chapter 3 of the book "Theory and Research Methods of Metallic Corrosion," published originally by the Publishing House of the Acadamy of Science, U.S.S.R., Moscow, 1945.)